United States Patent [19]

Devin et al.

[11] 4,315,498

[45] Feb. 16, 1982

[54] SOLAR COLLECTOR

[75] Inventors: Bernard Devin, Gif-sur-Yvette; Jean-Paul Durand, Fontaine par Chateau Landon; Michel Guillemot, Talant, all of France

[73] Assignee: Commissariat a l'Energie Atomique, France

[21] Appl. No.: 139,138

[22] Filed: Apr. 10, 1980

[30] Foreign Application Priority Data

Apr. 13, 1979 [FR] France .................. 79 09409

[51] Int. Cl.³ .............................................. F24J 3/02
[52] U.S. Cl. .................................. 126/422; 126/433; 165/32
[58] Field of Search ............... 126/418, 433, 434, 435, 126/422; 165/96, 32

[56] References Cited

U.S. PATENT DOCUMENTS

| 3,399,717 | 9/1968 | Cline | 165/32 |
| 3,519,067 | 7/1970 | Schmidt | 165/32 |
| 3,735,806 | 5/1973 | Kirkpatrick | 165/32 |
| 3,957,107 | 5/1976 | Altoz | 165/32 |
| 4,073,284 | 2/1978 | Laing | 126/422 |
| 4,167,936 | 9/1979 | Hackworth | 165/96 |

Primary Examiner—Albert W. Davis
Assistant Examiner—G. Anderson
Attorney, Agent, or Firm—Michael N. Meller; Anthony H. Meller

[57] ABSTRACT

Solar collector of the heat pipe type, comprising in per se known manner a case or container containing a heat pipe absorber of the solar energy, insulation placed between the absorber and the bottom of the container, at least one glass partition on the container, as well as the devices necessary for assembling and sealing the system, said heat pipe absorber being constituted by a tightly sealed case formed by a first heat collecting wall, a second wall forming the base and sidewalls, a capillary system lining the inside of the case and a heat transfer fluid which wets this capillary system, wherein the capillary system comprises a first part applied to the first wall and a second part applied to the second wall and wherein at least one of the said first and second walls is deformable under the action of an overpressure in the case, said first and second parts of the capillary system having no point of contact when the wall is deformed and at least one line of contact when the wall is not deformed.

7 Claims, 5 Drawing Figures

SOLAR COLLECTOR

BACKGROUND OF THE INVENTION

The present invention relates to a solar collector of the heat pipe type which is selfprotected against internal overpressures. It can be used in installations which employ solar collectors.

Conventional solar collectors are known. They comprise a case or container containing a solar energy absorber fixed to a heat extraction system, an insulant placed between the absorber and the case in order to reduce the heat losses by conduction, one or more glass partitions for reducing the heat losses by convection and radiation and the devices necessary for the assembly and sealing thereof.

The heat pipe is also known. It is in the form of a generally elongated container, which contains a fluid vapourizable under the normal conditions of use of said heat pipe. It makes it possible to effect a heat transfer by vapourization at one of its ends, called the hot end, and by condensation at the other end, called the cold end of a heat transfer fluid in the vapour phase, which will be called hereinafter the heat pipe fluid. In general, the heat pipe is internally lined with a capillary system and is inclined in such a way that the cold end is raised with respect to the hot end. This makes it possible to ensure the return of the heat pipe fluid both by gravity and by capillarity after the condensation thereof.

When a solar absorber is joined to a heat pump, a conventional known heat pipe absorber is obtained. A description thereof is provided, for example, in French Pat. No. 7,442,799 filed on Dec. 18, 1974 and entitled "Device for energy transformation of absorbed or emitted energy", in the name of DORNIER SYSTEM GMBH.

In this type of apparatus, the heat pipe functions as a simple heat pipe of the type described hereinbefore. The heat applied at the hot end in this case comes from the plate joined to the heat pipe and which constitutes a solar energy absorber.

The inner walls of the heat pipe are lined with a capillary system making it possible for the heat pipe fluid to rise up to the heat collecting plate. This capillary system can be constructed in various ways. It can, for example, be constituted by a fine metal wick and the heat transmitted by the upper plate then vapourizes the heat pipe fluid.

The heat applied during the condensation of the heat pipe fluid is recovered by a heat extraction device positioned, in the same way as for the aforementioned heat pipe, at the high end of the heat pipe collector, which is inclined thereto by a few degrees relative to the horizontal so as to ensure the return of the heat pipe fluid by gravity. This heat extraction device, of which several types are known, uses a fluid which is called hereinafter the primary fluid and which circulates in a duct of said primary circuit.

This type of collector makes it possible to separate the absorption function from the transfer function by the heat extraction fluid.

However, an incident which frequently occurs with this type of installation is the stoppage of the removal of heat by the primary fluid, due for example to a breakdown in the pump which circulates this fluid or to a mechanical fault. This can be prejudicial both to the collector and to the primary circuit. Thus, the heat pipe continues to transmit heat to the primary fluid whilst the latter is no longer circulating and this leads to a temperature rise which can bring about the boiling of the primary fluid and can even fracture the ducts in which it is circulating. Furthermore, the pressure within the heat pipe, which is equal to the vapour tension of the heat transfer medium, increases due to the temperature rise, which damages the actual collector.

BRIEF SUMMARY OF THE INVENTION

The present invention aims at obviating these disadvantages by using a special type of heat pipe absorber.

This heat pipe absorber which is placed in a solar collector of the heat pipe type comprises a tightly sealed container within which there is a fluid which is vapourizable under the normal operating conditions of the absorber.

This container comprises an upper planar plate which receives the heat on its upper face, the lower face of said plate being covered by a capillary system. The container also comprises a base which can be of different types and which has a double function. It firstly forms a structure for preventing the crushing of the container during the normal operation of the absorber. During this phase, the temperature of the heat pipe fluid is lower than boiling temperature, so that the pressure within the absorber is below atmospheric pressure. In addition, the bottom is covered by a capillary system which, during normal operation, is kept in contact with the capillary system joined to the upper plate by the action of atmospheric pressure forces. According to a constructional variant, this structure can also be obtained by adding to the flat base spacers which are themselves lined with a capillary system. These spacers are joined to the base or are laterally secured so that they do not tilt during removal of the cover in the case of overheating and internal overpressures. The container also has lateral faces constructed so as to have a thermal resistance which is sufficiently high to ensure a limited heat conduction from the upper face to the bottom of the container, as will be seen hereinafter. A corrugation is provided at the two lateral ends and this has two functions. Firstly, it ensures the sealing of the container and secondly it provides for an adequate thermal resistance.

The heat duct collector, incorporating the aforementioned absorber, is inclined by a few degrees relative to the horizontal and at the top thereof is provided the device for extracting the heat resulting from the condensation of the heat pipe liquid. This permits the return by gravity of the heat pipe fluid once it has been condensed.

The heat extraction device can be of several different types. It can firstly be in the form of a U-shaped pin. A tube traversed by the primary fluid enters the container and then leaves it again. It is necessary for this pin to be well insulated from the container and specifically in an area where, as a result of the construction principles, there are no channels serving to prevent the crushing of the container. It can also be of the hollow member type when the heat pipe is terminated by such a hollow member welded to one face of the heat pipe and being immersed in the primary duct.

The upper plate of the container is sufficiently flexible to ensure that an increase in the pressure within the absorber leads to a separation of a few millimeters of the two capillary systems in such a way that the heat pipe liquid wetting the lower system cannot wet the capillary system joined to the upper plate.

The heat pipe absorber is filled with a liquid, whose boiling temperature Tc is equal to or below the boiling temperature Tp of the primary liquid.

The heat pipe absorber is fitted in the same way as a conventional solar absorber within a case, whose case is covered by an insulating layer which serves to prevent heat losses and whose upper part has one or more glass partitions.

In normal operation, the system behaves like a conventional heat pipe absorber, i.e. the heat collected by the upper plate is used for vapourizing the liquid wetting the capillary system joined thereto. This vapour condenses at the upper end of the collector, where it transfers the heat given off during condensation to the primary fluid. The liquid resulting from this condensation falls again due to gravity and as a result of the capillary system on the bottom of the container, resupplies the system joined to the upper plate with liquid. This normal operation continues for as long as the primary fluid temperature is below Tc, i.e. the boiling temperature of the heat duct fluid.

Assuming that there is a stoppage to the circulation of the primary fluid, the heat pipe continues to operate for a certain time. However, as the main fluid no longer circulates, its temperature in the heat removal zone rises and finally exceeds Tc, which is the normal boiling temperature of the heat pipe fluid. The liquid then boils and this leads to an increase in the pressure in the heat pipe enclosure. When this pressure exceeds atmospheric pressure, the upper plate of the container, designed so as to be sufficiently flexible, deforms in such a way that the upper and lower capillary systems separate. The distance between these two systems must be sufficient so that there is no longer any wetting of the upper capillary system which, as it is no longer supplied with fluid becomes dry. The heat transfer from the upper plate to the bottom of the absorber now essentially only takes place by conduction through the lateral faces, which leads to a rise in the temperature up to a limit value $T_1$. The heat pipe liquid, which, during normal operation, was vapourized by contact with the upper plate, is no longer subject to this action. The lateral faces are dimensioned (thickness, height) in such a way as to have a thermal resistance such that the bottom of the absorber cannot reach Tc, taking account of the heat losses by the insulation lining of the bottom of the container of the collector. Therefore, the heat pipe operation is interrupted. This leads to a considerable drop in the heat transmission to the primary circuit and therefore of the dangers of overpressures in said circuit. In addition, the internal pressure of the absorber rises much less than in the case where vapourization of the heat pipe fluid is continued. Thus, the invention protects both the heat pipe absorber and the primary circuit.

Obviously, the phenomenon is reversible and as soon as heat extraction by the primary circuit resumes, the pressure in the absorber drops, the two capillary systems come into contact again under the action of atmospheric pressure forces and the normal operation of the heat pipe, as defined hereinbefore, recommences.

BRIEF DESCRIPTION OF THE DRAWINGS

The invention is described in greater detail hereinafter relative to preferred and nonlimitative embodiments and with reference to the attached drawings, wherein show.

DETAILED DESCRIPTION OF THE PREFERRED EMBODIMENTS

Figure 1:
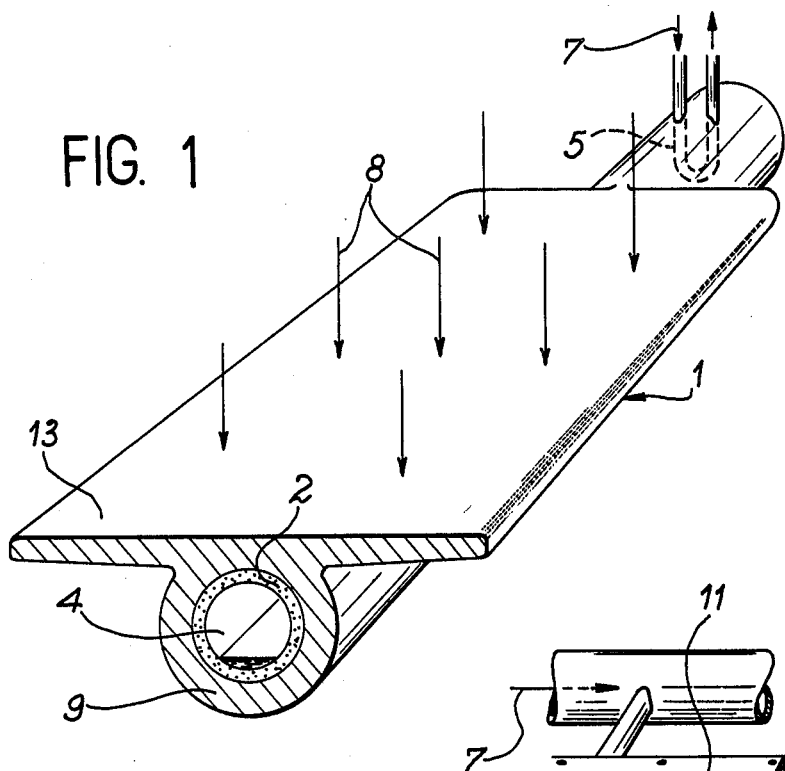
FIG. 1 a conventional known heat pipe absorber.

FIG. 1 shows a conventional known heat pipe absorber with a collecting surface 1 for solar energy 8 and onto which is joined a heat conducting tube 9 with a heat pipe action and internally lined with a capillary system 2. The inner area 4 of the tube contains a small quantity of fluid which rises under capillary action towards the heat collecting plate 1, where it vapourizes. The vapour produced condenses at cold point 5 where the heat is removed by the primary liquid 7. The condensed fluid then returns to the hot end 13 by gravity and capillarity.

If for any reason there is a stoppage in the circulation of primary liquid 7 which serves to extract heat from the heat pipe fluid this can lead to an incident, whose consequences have been described hereinbefore. Thus, it leads to a rise in the temperature of the primary fluid 7 in zone 5 and to an increase in the pressure in heat pipe area 4, which can bring about the destruction of the heat pipe.

Figure 2:
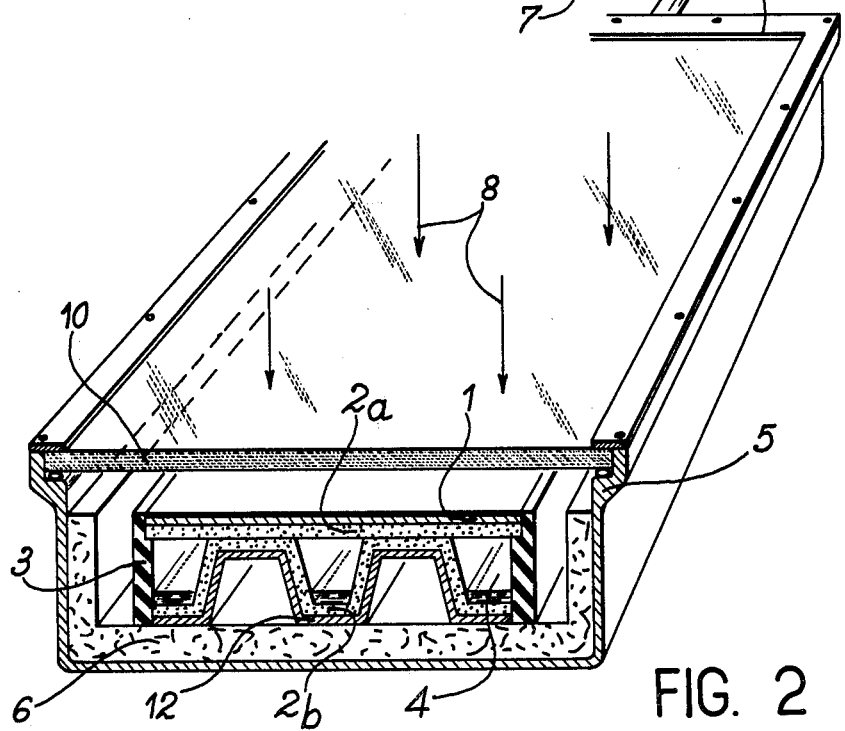
FIG. 2 a section through the collector according to the present invention.

The heat pipe collector according to the present invention is shown in FIG. 2. In normal operation, the planar collecting plate 1 for solar energy 8 vapourizes the heat pipe fluid wetting the capillary system 2a joined to the upper plate 1. After transferring the heat, given off during condensation, to the primary fluid 7 whose ducts are located on the side of the upper end 11 of the collector which is inclined by a few degrees relative to the horizontal so as to permit the gravity return of the condensed fluid, the fluid rises along the structure forming the mechanical reinforcement 12 by means of the capillary system 2b. In normal operation, the capillary systems 2a and 2b are kept in contact with one another by the action of the atmospheric pressure forces, so that the heat pipe liquid wetting the capillary system 2b resupplies the system 2a joined to the upper plate 1.

If as a result of a stoppage to the circulation of the primary liquid 7 which serves to extract heat, the temperature of said liquid exceeds Tc, the liquid filling the heat pipe boils and increases the pressure in the heat pipe area 4. This overpressure leads to the separation of upper plate 1 and base 12 of the heat pipe. As the two capillary systems 2a, 2b are no longer in contact, the upper system 2a dries up and heat is transferred from upper face 1 to the base 12 of the heat pipe essentially by the lateral faces 3. The lateral faces 3 are constructed in such a way as to have a thermal resistance sufficient so that, in such cases, the conduction of heat from the upper planar plate 1 to the bottom of the heat pipe collector 12 is sufficiently reduced to ensure that the temperature of the latter does not exceed Tc, i.e. the boiling temperature of the heat pipe liquid, taking account of the losses due to the insulation 6 lining the bottom of the container 5. Therefore, heat pipe operation is interrupted, which protects both the collector and the primary heat removal circuit. The temperature of the upper plate then rises to a limit value $T_1$. The side walls 3 can be made from stainless steel or plastics material, taking account of the limit temperature. This phenomenon is reversible and as soon as heat extraction by the primary circuit resumes, the pressure in area 4 drops, the two capillary systems 2a, 2b come into contact again under the action of the pressure forces and the heat pipe action resumes. Container 5 has one or more glass partitions 10 which reduce the heat losses by convection and radiation.

Figure 3:
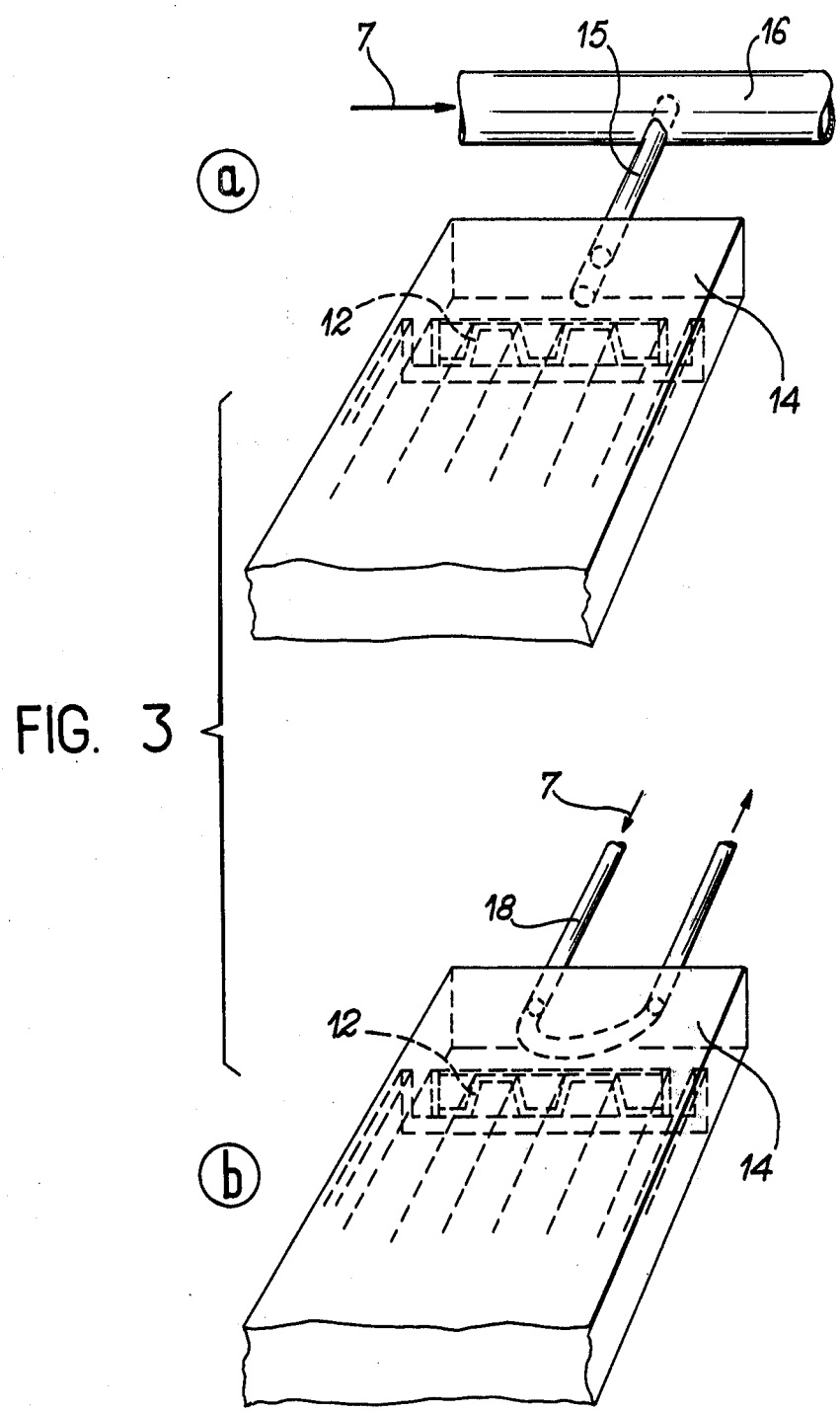
FIG. 3 different constructions of the heat extraction device.

FIG. 3 shows various constructional variants of the heat extraction device.

FIG. 3a shows a device of the hollow member type in which the heat duct collector 14 is terminated by a hollow member 15 welded to the face of the heat pipe and immersed in the main duct 16 in which circulates the primary liquid 7.

FIG. 3b shows a heat extraction device of the U-shaped pin type. A tube 18 traversed by the primary liquid 7 enters the container 14 and then leaves it again. It is necessary for pin 18 to be well insulated from the container and specifically in an area where there is an interruption of the channels on the base 12.

Figure 4:
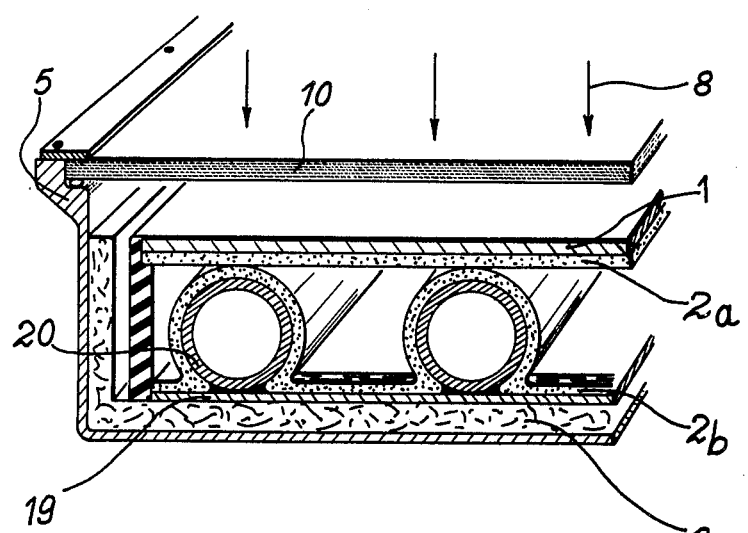
FIG. 4 a constructional variant of the bottom of the absorber.

FIG. 4 shows a variant of the construction of the bottom of the container. The latter is constituted by a planar plate 19 to which are fixed tubes 20 lined with a capillary system 2b. During the normal operation of the heat pipe collector the latter capillary system is in contact with system 2a joined to the upper planar plate 1, which collects heat 8. The spacing of spacers 20 is based on mechanical considerations and the possibilities of wetting the said material 2b by the heat pipe fluid.

Figure 5:
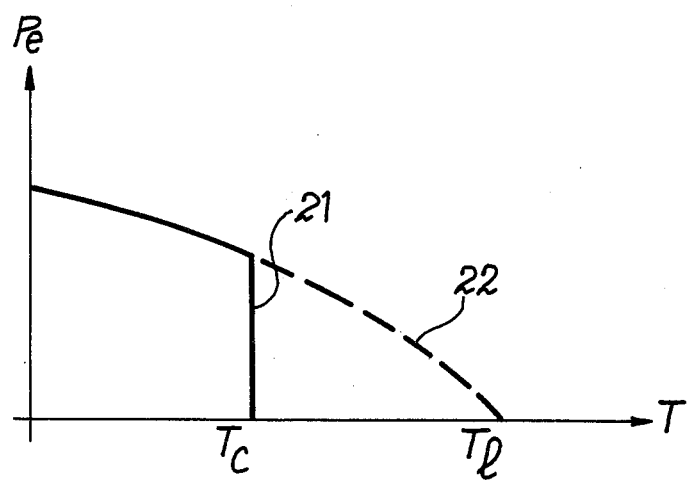
FIG. 5 the characteristics of the power extracted from the collector as a function of the temperature.

FIG. 5 shows the characteristics of the extracted power (Pe) as a function of the temperature (T) of the heat pipe liquid, with a solar collector according to the present invention and a conventional heat pipe solar collector. Curve 21 is the characteristic of the heat pipe collector according to the invention, whilst dotted curve 22 is that of a known heat pipe collector. In the first case, it is apparent that when the temperature within the heat pipe reaches Tc, the extracted power suddenly drops, whereas with a known collector it slowly decreases until the temperature within the heat pipe reaches $T_1$, the limit temperature of the heat collecting plate.

What is claimed is:

1. A solar collector of the heat pipe type, comprising in per se known manner a container containing a heat pipe absorber of the solar energy, insulation placed between the absorber and the bottom of the container, at least one glass partition on the container, as well as the devices necessary for assembling and sealing the system, said heat pipe absorber being constituted by a tightly sealed case formed by a first heat collecting wall, a second wall forming the base, and side walls, a capillary system lining the inside of the case and a heat transfer fluid which wets this capillary system, wherein the capillary system comprises a first part applied to the first wall and a second part applied to the second wall and wherein at least one of the said first and second walls is deformable under the action of an overpressure in the case, said first and second parts of the capillary system having no point of contact when the wall is deformed and at least one line of contact when the wall is not deformed.

2. A solar collector of the heat pipe type according to claim 1, wherein the first and second parts of the capillary system have no point of contact as a result of the deformation of at least one of the walls, the upper wall and the lower wall only being thermally collected by the side walls dimensioned as a function of the insulation of the absorber.

3. A solar collector of the heat pipe type according to claim 2, wherein its sidewalls are made from a material having a good mechanical resistance and a low thermal conductivity.

4. A solar collector of the heat pipe type according to claim 3, wherein the walls of the absorber are made from a material able to withstand the limit temperature.

5. A solar collector of the heat pipe type according to claim 1, wherein the boiling temperature of the heat pipe fluid contained therein is below that of the primary liquid it serves to remove the heat resulting from the condensation of the said heat pipe fluid.

6. A solar collector of the heat pipe type according to claim 1, wherein the base of the container is constituted by channels forming the mechanical reinforcement so as to prevent the crushing thereof when the pressure therein is below atmospheric pressure.

7. A solar collector of the heat pipe type according to claim 1, wherein the bottom of the container comprises a flat base to which is fixed a system of spacers so as to prevent the crushing of the container when the pressure therein is below atmospheric pressure.

* * * * *